United States Patent
Trif et al.

(10) Patent No.: US 12,512,564 B2
(45) Date of Patent: Dec. 30, 2025

(54) METHOD AND APPARATUS FOR ELECTRICAL CONTACTING OF CELLS OF A BATTERY

(71) Applicant: Robert Bosch GmbH, Stuttgart (DE)

(72) Inventors: Christian Trif, Kusterdingen (DE);
Erzsebet Sara Bogya, Budapest (HU);
Milia Lambidou, Reutlingen (DE);
Nathanael Eisenreich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 451 days.

(21) Appl. No.: 17/457,879

(22) Filed: Dec. 6, 2021

(65) Prior Publication Data
US 2022/0200104 A1 Jun. 23, 2022

(30) Foreign Application Priority Data
Dec. 18, 2020 (DE) ...................... 10 2020 216 323.5

(51) Int. Cl.
*H01M 50/528* (2021.01)
*B23K 26/70* (2014.01)
*H01M 50/564* (2021.01)

(52) U.S. Cl.
CPC ........... *H01M 50/528* (2021.01); *B23K 26/70* (2015.10); *H01M 50/564* (2021.01)

(58) Field of Classification Search
CPC ............. H01M 50/528; H01M 50/564; H01M 50/522; H01M 50/545; H01M 50/56;
(Continued)

(56) References Cited

U.S. PATENT DOCUMENTS

2011/0290276 A1* 12/2011 Cha ...................... B23K 26/352
  134/1
2012/0055909 A1* 3/2012 Miyake .................. B23K 26/60
  219/121.64
(Continued)

FOREIGN PATENT DOCUMENTS

DE 102014116283 A1 5/2016
DE 102018121696 A1 * 3/2020 ............ H01M 50/20
(Continued)

OTHER PUBLICATIONS

English translation of DE102018121696A1 (Year: 2020).*

*Primary Examiner* — Ula C Ruddock
*Assistant Examiner* — Sarika Gupta
(74) *Attorney, Agent, or Firm* — NORTON ROSE FULBRIGHT US LLP

(57) ABSTRACT

A method and an apparatus for electrical contacting of cells of a battery. The method includes: using a laser beam having a first beam energy to remove contamination in a region, provided for electrical contacting, of an electrically conductive outer surface of a first cell of the battery; using a laser beam having a second beam energy higher than the first, to generate at least one marking in the outer surface of the first cell, the marking having a predefined spatial relationship to the region provided for electrical contacting; and electrically contacting the first cell using a connecting apparatus, the marking being used by the connecting apparatus to localize that region of the first cell which is provided for electrical contacting in order to connect said region by way of an electrically conductive connecting element to a region, provided for electrical contacting, of a second cell of the battery.

10 Claims, 3 Drawing Sheets

(58) Field of Classification Search
CPC ............. H01M 50/566; H01M 50/571; H01M 50/516; H01M 50/514; B23K 26/70; Y02E 60/10; H01R 4/02; H01R 43/02
See application file for complete search history.

(56) References Cited

U.S. PATENT DOCUMENTS

| | | |
|---|---|---|
| 2018/0369963 A1 | 12/2018 | Tsukui et al. |
| 2020/0274133 A1 | 8/2020 | Masumura et al. |

FOREIGN PATENT DOCUMENTS

| | | |
|---|---|---|
| EP | 3731297 A1 | 10/2020 |
| JP | 2017107814 A | 6/2017 |

\* cited by examiner

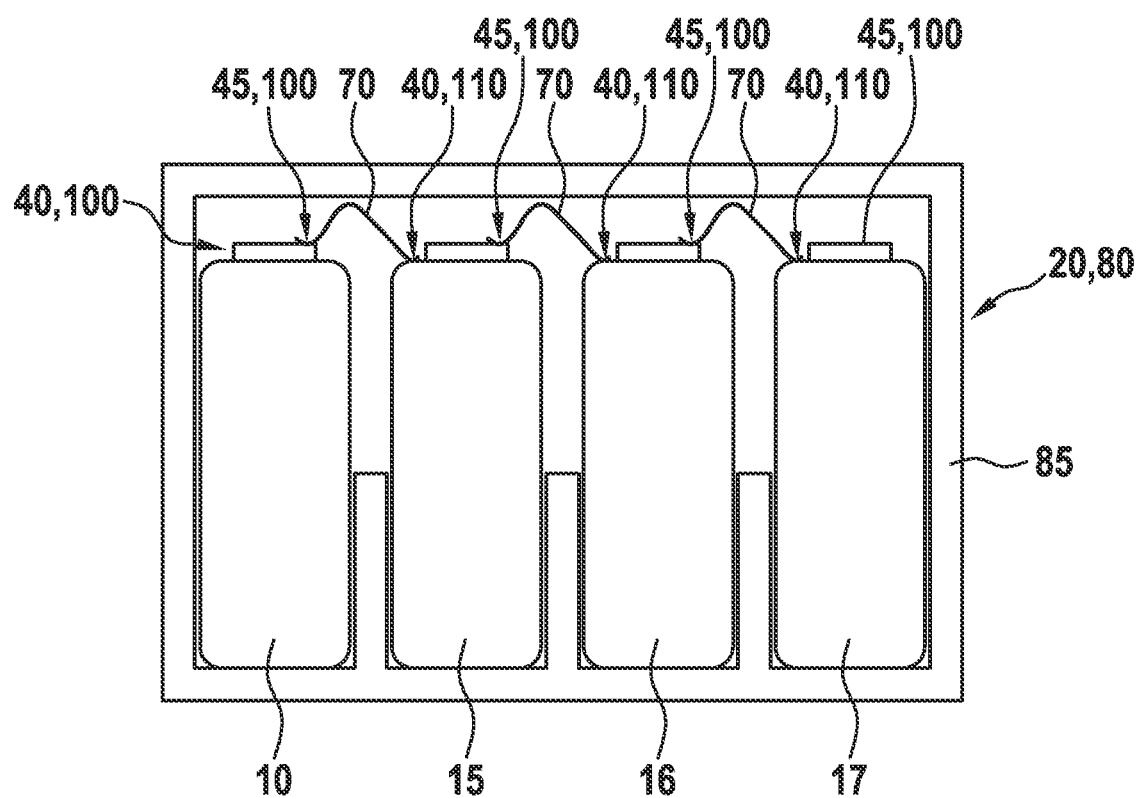

METHOD AND APPARATUS FOR ELECTRICAL CONTACTING OF CELLS OF A BATTERY

CROSS REFERENCE

The present application claims the benefit under 35 U.S.C. § 119 of German Patent Application No. DE 102020216323.5 filed on Dec. 18, 2020, which is expressly incorporated herein by reference in its entirety.

FIELD

The present invention relates to a method and an apparatus for electrical contacting of cells of a battery.

BACKGROUND INFORMATION

Mobile rechargeable energy reservoirs in the e-mobility sector, such as those used, for example, for electric bicycles or electric scooters, generally are made up of several individual lithium ion cells that are encased and enclosed by a housing. Several cells are connected, as a parallel and/or series circuit, to produce a battery pack of this kind so that specific levels of voltage or capacity can be furnished. Methods such as ultrasonic wire bonding, etc. are used, for example, to create an electrical connection between the cells or between a respective cell and a so-called "cell connector."

Among the methods used in the related art for automatic identification of contact regions of respective cells which are to be connected are optical recognition methods which, as a rule, impose minimum requirements in terms of the contrast existing between different regions of the surfaces of the cells. Accurate localization of respective contact regions is very important in particular in connection with single-end contacting of cells to one another (i.e., both poles of the respective cells are accessible at the same end for contacting, for instance at one end face of the cells), since with such a configuration of the cells the respective pole contacts usually have small surfaces available for contacting, and consequently are more difficult to contact reliably.

In the context of the manufacture of battery cells, contamination can occur on an outer surface of the cells and, for example, can also affect the respective electrical contacting regions of the cells.

SUMMARY

In accordance with a first aspect of the present invention, a method for electrical contacting of cells of a battery is provided. In accordance with an example embodiment of the present invention, an external conformation and/or a capacity and/or a battery technology used for the respective cells is in no way limited with regard to the present invention. In the interest of a simplified description, the description below is based representatively (unless otherwise indicated) on cells that are embodied as round cells contactable at one end (i.e. both poles of the battery are contactable at one end of the battery, for instance at one end face). A battery of this kind manufactured according to the present invention is used, for example, in means of locomotion such as e-bikes, e-scooters, or electrically propelled passenger cars or commercial vehicles.

In a first step of the method according to an example embodiment of the present invention, a laser beam having a first beam energy is used to remove contamination in at least one region, provided for electrical contacting, of an electrically conductive outer surface of a first cell of the battery. Such removal of contamination, which can occur, for example, during production and/or storage and/or transport and/or prior processing of the cells, offers the particular advantage that subsequent contacting of the at least one contacting region of the cells can be carried out under substantially uniform boundary conditions, with the result that the reliability of such contacting can be improved. Be it noted that the cleaning method described here based on the laser beam can be assisted by a previous and/or subsequent additional cleaning based on methods differing therefrom (e.g., wet-chemical cleaning, plasma cleaning, or mechanical cleaning). Be it noted also that it is possible that the region provided for electrical contacting is merely a sub-region of a larger region potentially usable for electrical contacting (e.g., a circle segment of an annularly or circularly configured potentially usable region). This offers the advantage that the cleaning operation is limited to such a sub-region, with the result that cleaning can be carried out in a shorter time and/or with less energy utilization.

In a second step of the method according to an example embodiment of the present invention, a laser beam having a second beam energy, which is higher than the first beam energy, is used to generate at least one marking in the outer surface of the first cell, the marking having a predefined spatial relationship to the region provided for electrical contacting. It is possible in principle to apply the at least one marking at any position on the outer surface of the first cell, but preferably it is applied in such a way that the spatial relationship of the at least one marking to the region provided for electrical contacting is perceptible in the simplest possible manner. This is the case, for example, if the at least one electrical contacting region is provided on an end face of the cell, and if the at least one marking is correspondingly applied likewise on that end face of the cell.

In a third step of the method according to an example embodiment of the present invention, the first cell is electrically contacted by way of a connecting apparatus, the marking being used by the connecting apparatus to localize that region of the first cell which is provided for electrical contacting in order to connect said region by way of an electrically conductive connecting element to a region, provided for electrical contacting, of a second cell of the battery. Be it noted that the respective contacting regions of the first cell and of the second cell which are to be electrically connected can, in the context of a parallel connection of the two cells, each represent the same electrical pole (positive or negative), while in the context of a series connection of the two cells the contacting regions to be connected can correspondingly represent different electrical poles. Be it noted in particular that the steps described here of the method according to the present invention are applicable to each of the two electrical poles of the respective cells. It is furthermore possible, on the basis of the steps described here of the method according to the present invention, to prepare and to contact further cells to the first cell and to the second cell for conjoint electrical contacting.

A need for localization of the at least one electrical contacting region of the first cell and/or of the second cell arises, for example, from the fact that the respective cells to be electrically contacted become moved after the marking operation (for instance because the individual method steps are carried out at different locations), with the result that their dispositions and/or orientations with respect to one another may be modified. Utilization according to the present invention of the above-described marking furthermore allows consideration of production tolerances (e.g. different diameters of the cells) when specifying the predefined spatial relationship to the at least one electrical contacting region. The method according to the present invention furthermore offers advantages with regard to faster identification of the regions to be electrically contacted and/or more reliable positioning of the electrically conductive connecting element during the contacting operation, thereby achieving improved prevention of incorrect contacting or short-circuiting during production of the battery.

Preferred refinements and example embodiments of the present invention are disclosed herein.

In an advantageous embodiment of the present invention, the electrically conductive connecting element is a metal wire and/or a metal ribbon. Also preferably, the electrically conductive connecting element is connected to the respective contacting regions of the first cell and of the second cell by way of a bonding method that particularly preferably encompasses a welding method (e.g. ultrasonic bonding, etc.) or a soldering method.

The first beam energy is preferably specified, depending on an existing nature and/or intensity of the contamination existing on the outer surface of the first cell, in such a way that substantially only the contamination is removed. In other words, the beam energy is specified in such a way that a material (as a rule a metallic material) of the electrical contacting region that is to be cleaned by way of the cleaning operation preferably is not, or is only very slightly, influenced by the cleaning operation. It is possible in this connection to automatically adapt the first beam energy depending on a contamination level respectively present on each individual cell or on a predefined set of cells (e.g. cells of the same production batch, etc.). A nature and/or intensity of contamination which is respectively present can be detected for this purpose, for example, by way of optical sensors.

Also preferably, the second beam energy is specified, depending on a material present in the region of the marking, in such a way that a contrast-generating tempering and/or contrast-generating patterning of the outer surface of the cell is produced. Here as well, it is possible to automatically adapt the second beam energy depending on a material respectively used in the region of the marking on individual cells or on a predefined set of cells.

Particularly advantageously, the at least one marking is embodied as a dot and/or cross and/or ring and/or rectangle, the marking according to the present invention not being thereby limited to the manifestations recited above.

In an advantageous embodiment of the present invention, the marking is disposed inside and/or outside the region of the first cell which is provided for contacting. Alternatively or additionally, at least two markings are used in order to identify the contacting region. For example, it is possible to place two dots or two crosses in the vicinity of the electrical contacting region, in such a way that the electrical contacting region lies at the center point of a connecting line between the two dots or the two crosses.

It is furthermore possible that respective cells of the battery which are to be connected are mechanically connected to yield a battery pack before marking, so that any change in the orientation of their respective contacting regions with respect to one another is substantially suppressed. Since it is possible even in such a case for movements and/or rotations of the individual cells with respect to one another to occur because of production tolerances of the individual cells and/or production tolerances of an element (e.g. a housing element) used for mechanical connection, localization according to the present invention of the electrical contacting regions is advantageously usable in this case as well. Alternatively, it is possible to mechanically connect respective cells of the battery which are to be connected to yield a battery pack only after marking, the markings of the respective cells of the battery being used in particular for predefined (preferably automated) alignment of their respective contacting regions within the battery pack.

The method according to the present invention is furthermore suitable for carrying out electrical connection of the cells of the battery at one end or at two ends. Single-end connection signifies, as already described above, that both poles of the respective cells are accessible for contacting at one and the same end, for instance on one end face of the cell; while double-end connection signifies that the two poles of the battery are accessible at different ends of the cell (e.g. on oppositely located end faces of the cell).

In the case in which cells that are embodied as round cells are used, the at least one contacting region of the first cell is preferably a flat region of a shoulder of that cell. It is furthermore possible for that region of the shoulder of the cell to represent the negative pole or the positive pole of the cell.

In accordance with a second aspect of the present invention, an apparatus for electrical contacting of cells of a battery is provided. In accordance with an example embodiment of the present invention, the apparatus has a laser apparatus and a connecting apparatus, the laser apparatus being configured to emit a laser beam having a first beam energy in order to remove contamination in at least one region, provided for electrical contacting, of an electrically conductive outer surface of a first cell of the battery. The laser apparatus is further configured to emit a laser beam having a second beam energy that is higher than the first beam energy, in order to generate at least one marking in the outer surface of the first cell, the marking having a predefined spatial relationship to the region provided for electrical contacting. The connecting apparatus is configured to use the marking in order to localize that region of the first cell which is provided for electrical contacting, in order to electrically contact said region and to connect it to a region, provided for electrical contacting, of a second cell of the battery via an electrically conductive connecting element. The features and feature combinations, and the advantages resulting therefrom, correspond with sufficient clarity to those discussed in connection with the aspect of the present invention described above, so that reference will be made to the above discussions in order to avoid repetition.

BRIEF DESCRIPTION OF THE DRAWINGS

Exemplifying embodiments of the present invention will be described in detail below with reference to the figures.

FIG. 3 is a schematic side view of a battery according to an example embodiment of the present invention.

DETAILED DESCRIPTION OF EXAMPLE EMBODIMENTS

Figure 1A:
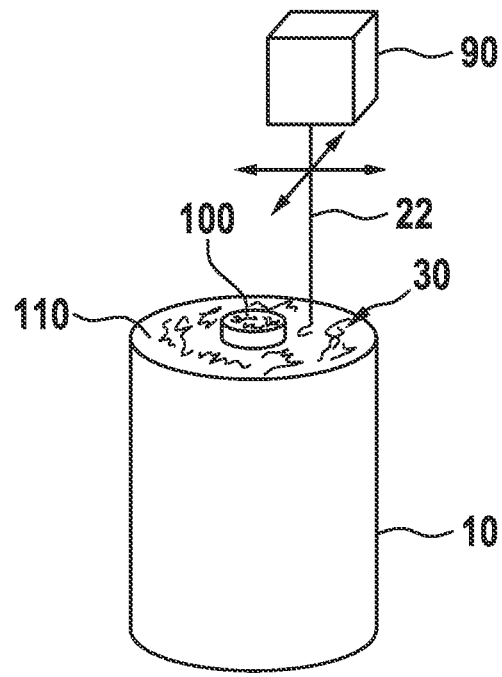
FIGS. 1A to 1C schematically depict production steps of cells of a battery in accordance with a method according to an example embodiment of the present invention.
Figure 1B:
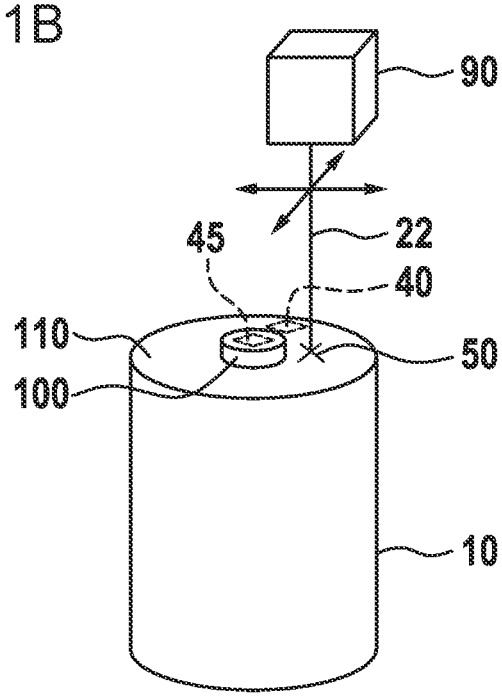
Figure 1C:
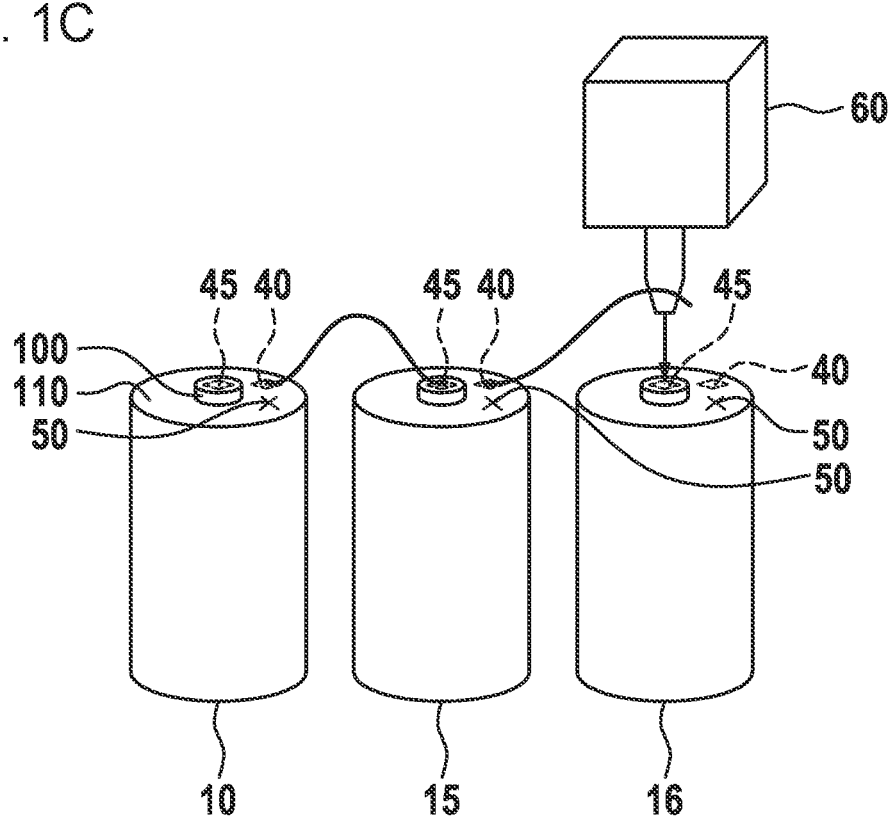

FIGS. 1A to 1C schematically depict manufacturing steps of cells 10, 15, 16 of a battery 20 in accordance with a method according to the present invention, the cells being embodied here as round cells contactable at one end.

In the first step of the method according to the present invention, as shown in FIG. 1A, a laser beam 22 of a laser apparatus 90, which beam has a first beam energy, is used to remove contamination 30 in the region of a positive pole 100 and a negative pole 110 of first cell 10 which respectively represent electrical contacting regions 40, 45. For this, as indicated by the arrows in FIG. 1A, laser beam 22 is guided over the regions of first cell 10 which are to be cleaned. Be it noted that in order to simplify the depiction, an insulator that is necessary between positive pole 100 and negative pole 110 is not shown here.

The first beam energy is preferably adapted automatically to a respective intensity and nature of contamination 50 that is present.

In the second step of the method according to the present invention as shown in FIG. 1B, a laser beam 22 of laser apparatus 90, which beam has a second beam energy that is higher than the first beam energy, is used to generate a cross-shaped marking 50 in the region of negative pole 110 of first cell 10, marking 50 having a predefined spatial relationship to a region 40 provided for electrical contacting.

The second beam energy is preferably adapted automatically to a material used in electrical contacting region 40, 45.

In the third step of the method according to the present invention, as shown in FIG. 1C, first cell 10 is electrically contacted by way of a bonding apparatus 60, marking 50 being used by bonding apparatus 60 to localize that region 40 of first cell 10 which is provided for electrical contacting in order to connect it by way of an electrical bonding wire 70 to a region 45, provided for electrical contacting, of a second cell 15 of battery 20. Bonding apparatus 60 is used analogously to electrically connect second cell 15 to a third cell 16, all cells 10, 15, 16 that are to be connected each having previously gone through the first and the second step of the method according to the present invention.

Figure 2:
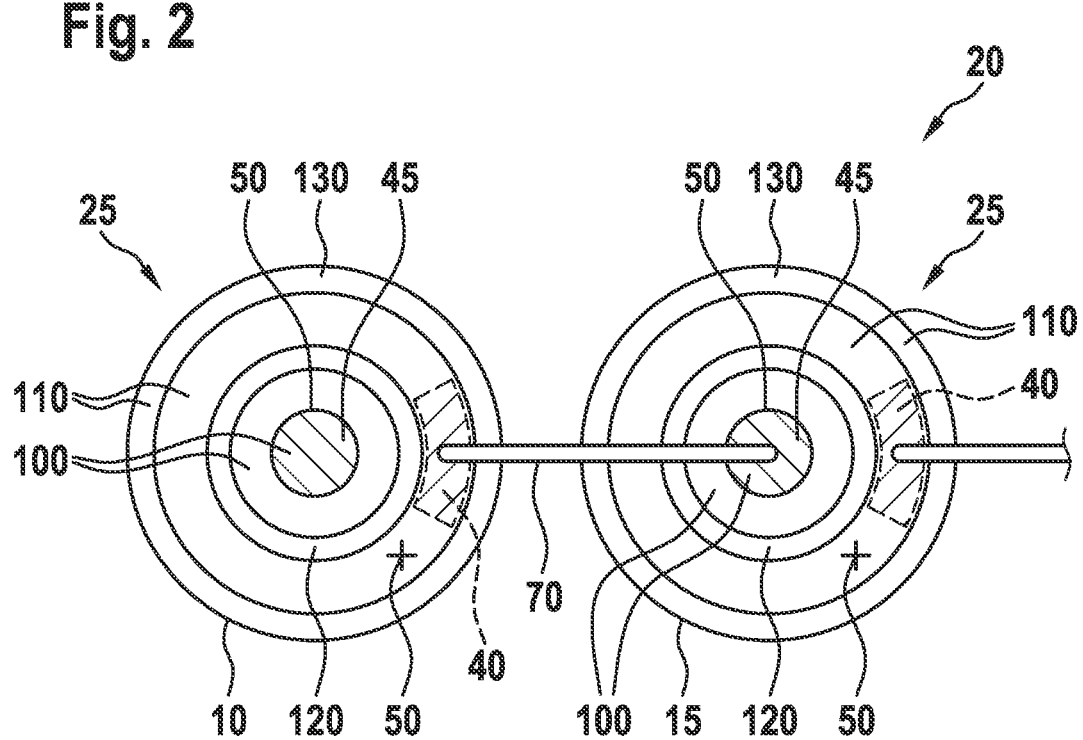
FIG. 2 is a schematic plan view of cells of a battery according to an example embodiment of the present invention.

FIG. 2 is a schematic plan view of cells 10, 15 of a battery 20 according to the present invention. The cells each have in their outer surfaces 25 a first electrical contacting region 40 and a second electrical contacting region 45, first electrical contacting region 40 enabling contacting to a negative pole 110 of cell 10, 15, and second electrical contacting region 45 enabling contacting to a positive pole 100 of cell 10, 15. First contacting region 40 is located here in a flat region of a shoulder 130 of cell 10, 15. Positive pole 100 and negative pole 110 of cells 10, 15 are each electrically separated from one another by an insulator 120. An annular marking 50 is respectively provided in the surface of positive pole 100 with a predefined spatial relationship to second electrical contacting region 45. A cross-shaped marking 50 is respectively provided in the surface of negative pole 110 with a predefined spatial relationship to first contacting region 40. Based on this configuration, bonding apparatus 60 according to the present invention is capable of electrically contacting first cell 10 to second cell 15 in particularly exact and reliable fashion by way of a bonding ribbon 70. Also indicated is an electrical connection to further cells of battery 20 by way of a further bonding ribbon 70.

FIG. 3 is a schematic side view of a battery 20 according to the present invention. Battery 20 encompasses an assemblage of cells 10, 15, 16, 17 which corresponds substantially to the assemblage shown in FIG. 2; in order to avoid repetition, only the differences from FIG. 2 will therefore be described here. Cells 10, 15, 16, 17 here are additionally mechanically connected by way of a housing body 85 to yield a battery pack 80. Because suitable openings (not depicted here) are provided in housing body 85 in the region of electrical contacting regions 40, 45 it is additionally possible, on the basis of the method according to the present invention, to clean, mark, and electrically connect cells 10, 15, 16, 17 once they have already been introduced into housing body 85.

What is claimed is:

1. A method for electrical contacting of cylindrical cells of a battery, comprising the following steps:
using a laser beam having a first beam energy to remove contamination in at least one region, provided for electrical contacting, of an electrically conductive outer surface of a first cell of the battery;
using a laser beam having a second beam energy, which is higher than the first beam energy, to generate at least one marking in the outer surface of the first cell, the marking (i) having a predefined spatial relationship to the region provided for electrical contacting and (ii) used to identify the region provided for electrical contacting; and
electrically contacting the first cell using a connecting apparatus, the marking being used by the connecting apparatus to localize the region of the first cell which is provided for electrical contacting to connect the region using an electrically conductive connecting element in the form of a metal wire and/or a metal ribbon to a region, provided for electrical contacting, of a second cell of the battery,
wherein the marking includes a first marking provided in a surface of a positive pole and a second marking provided in a surface of a negative pole.

2. The method as recited in claim 1, wherein: the electrically conductive connecting element is connected to the contacting regions of the first cell and of the second cell using a bonding method, the bonding method being a welding method or a soldering method.

3. The method as recited in claim 1, wherein the first beam energy is specified, depending on an existing nature and/or intensity of the contamination of the outer surface of the first cell, in such a way that only the contamination is removed.

4. The method as recited in claim 1, wherein the second beam energy is specified, depending on a material present in a region of the marking, in such a way that a contrast-generating tempering and/or contrast-generating patterning of the outer surface is produced.

5. The method as recited in claim 1, wherein the at least one marking is:
a dot; and/or
a cross; and/or
a ring; and/or
a rectangle.

6. The method as recited in claim 1, wherein:
the marking is disposed inside and/or outside the region of the first cell which is provided for contacting; and/or
at least two markings are used as the marking to identify the contacting region.

7. The method as recited in claim 1, wherein respective cells of the battery which are to be connected:
are mechanically connected to yield a battery pack before marking, so that any change in an orientation of their respective contacting regions with respect to one another is suppressed; or
are mechanically connected to yield a battery pack after marking, the markings of the respective cells of the battery being used for predefined alignment of their respective contacting regions within the battery pack.

8. The method as recited in claim 1, wherein the electrical connection of the cells of the battery are accomplished at one end or at two ends.

9. The method as recited in claim 1, wherein the at least one contacting region of the first cell:
- is a flat region of a shoulder of the first cell, the first cell being a round cell of the battery; and/or
- represents negative pole or a positive pole of the first cell.

10. An apparatus for electrical contacting of cylindrical cells of a battery, comprising:
- a laser apparatus; and
- a connecting apparatus;
- wherein the laser apparatus is configured to:
  - emit a laser beam having a first beam energy to remove contamination in at least one region, provided for electrical contacting, of an electrically conductive outer surface of a first cell of the battery, and
  - emit a laser beam having a second beam energy that is higher than the first beam energy, to generate at least one marking in the outer surface of the first cell, the marking having a predefined spatial relationship to the region provided for electrical contacting, and
- wherein the connecting apparatus is configured to use the marking in order to localize the region of the first cell which is provided for electrical contacting, in order to electrically contact the region and to connect it via an electrically conductive connecting element in the form of a metal wire and/or a metal ribbon to a region, provided for electrical contacting, of a second cell of the battery,
- wherein the marking includes a first marking provided in a surface of a positive pole and a second marking provided in a surface of a negative pole.

* * * * *